US012452127B2

(12) United States Patent
Zong et al.

(10) Patent No.: US 12,452,127 B2
(45) Date of Patent: Oct. 21, 2025

(54) DATA MANAGEMENT IN A PUBLIC CLOUD NETWORK

(71) Applicant: Salesforce, Inc., San Francisco, CA (US)

(72) Inventors: Bo Zong, Bellevue, WA (US); Tony Wong, San Francisco, CA (US); Ran Yao, San Francisco, CA (US); Kin Lun Wong, San Francisco, CA (US); Daeki Cho, Bellevue, WA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/426,663

(22) Filed: Jan. 30, 2024

(65) Prior Publication Data

US 2025/0247286 A1    Jul. 31, 2025

(51) Int. Cl.
*H04L 41/16* (2022.01)
*H04L 41/069* (2022.01)
*H04L 67/50* (2022.01)

(52) U.S. Cl.
CPC ............ *H04L 41/069* (2013.01); *H04L 41/16* (2013.01); *H04L 67/535* (2022.05)

(58) Field of Classification Search
CPC ...... H04L 41/069; H04L 41/16; H04L 67/535
USPC ....................................................... 709/224
See application file for complete search history.

(56) References Cited

U.S. PATENT DOCUMENTS

| 12,014,219 | B1 | 6/2024 | Nair | |
| 12,131,242 | B1 | 10/2024 | Nair | |
| 2016/0350173 | A1* | 12/2016 | Ahad | H04L 67/02 |
| 2017/0111233 | A1* | 4/2017 | Kokkula | H04L 41/0823 |
| 2017/0279834 | A1* | 9/2017 | Vasseur | H04L 43/024 |
| 2018/0314835 | A1* | 11/2018 | Dodson | G06N 20/00 |
| 2018/0316707 | A1* | 11/2018 | Dodson | H04L 43/20 |
| 2021/0064431 | A1* | 3/2021 | Smith | G06F 9/5077 |
| 2024/0250529 | A1 | 7/2024 | Hess | |
| 2024/0250843 | A1 | 7/2024 | Linn | |
| 2024/0422808 | A1* | 12/2024 | Alasti | H04W 72/53 |
| 2025/0112462 | A1 | 4/2025 | Hess | |

\* cited by examiner

*Primary Examiner* — Karen C Tang
(74) *Attorney, Agent, or Firm* — Butzel Long

(57) ABSTRACT

A computer-implemented method is disclosed for predicting, based on a previous usage of a cloud-based computing resource by a number of users of the cloud-based computing resource, a future usage of the cloud-based computing resource. The method includes predicting, based on the predicted future usage of the cloud-based computing resource, an anomaly event at the cloud-based computing resource. The method also includes implementing a first anomaly mitigation action, based on the prediction of the anomaly event at the cloud-based computing resource and re-evaluating a status of the anomaly event at the cloud-based computing resource after the implementation of the first anomaly mitigation action. The method further includes implementing a second anomaly mitigation action at the cloud-based computing resource, based on the re-evaluation of the status of the anomaly event.

18 Claims, 7 Drawing Sheets

DATA MANAGEMENT IN A PUBLIC CLOUD NETWORK

BACKGROUND

The present disclosure relates to the field of cloud-based resource anomaly prediction, and more specifically, to mitigation of future anomaly of a cloud-based database resource based on a user's current usage of the cloud-based database resource.

Central Processing Units (CPU) at database servers (also referred to as "DBCPU"), are critical resources in a multi-tenant cloud environment. DBCPU typically determines how fast database servers can process customer requests and therefore, DBCPU may significantly impact service quality and availability. DBCPU resources are generally accessed by a number of users (also referred to as "customers" or "tenants") and when one user overuses DBCPU, the remaining users may suffer inferior service quality and availability. To protect and improve customer service experience, it is important to detect DBCPU overuse (also referred to as "anomaly"), identify the major contributors behind the overuse, and throttle the offending traffic from the major contributors. Conventional throttling methods put requests from the major contributors into a throttle queue and the speed of emission from such throttle queue is usually determined in a heuristic way. Throttle queues typically emit requests at a low speed so that the usage of the DBCPU comes down and the database servers are less stressed. The low speed and low DBCPU usage may, however, eventually time out customer requests and result in service disruption with high cost-to-serve.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

DETAILED DESCRIPTION

Figure 1A:
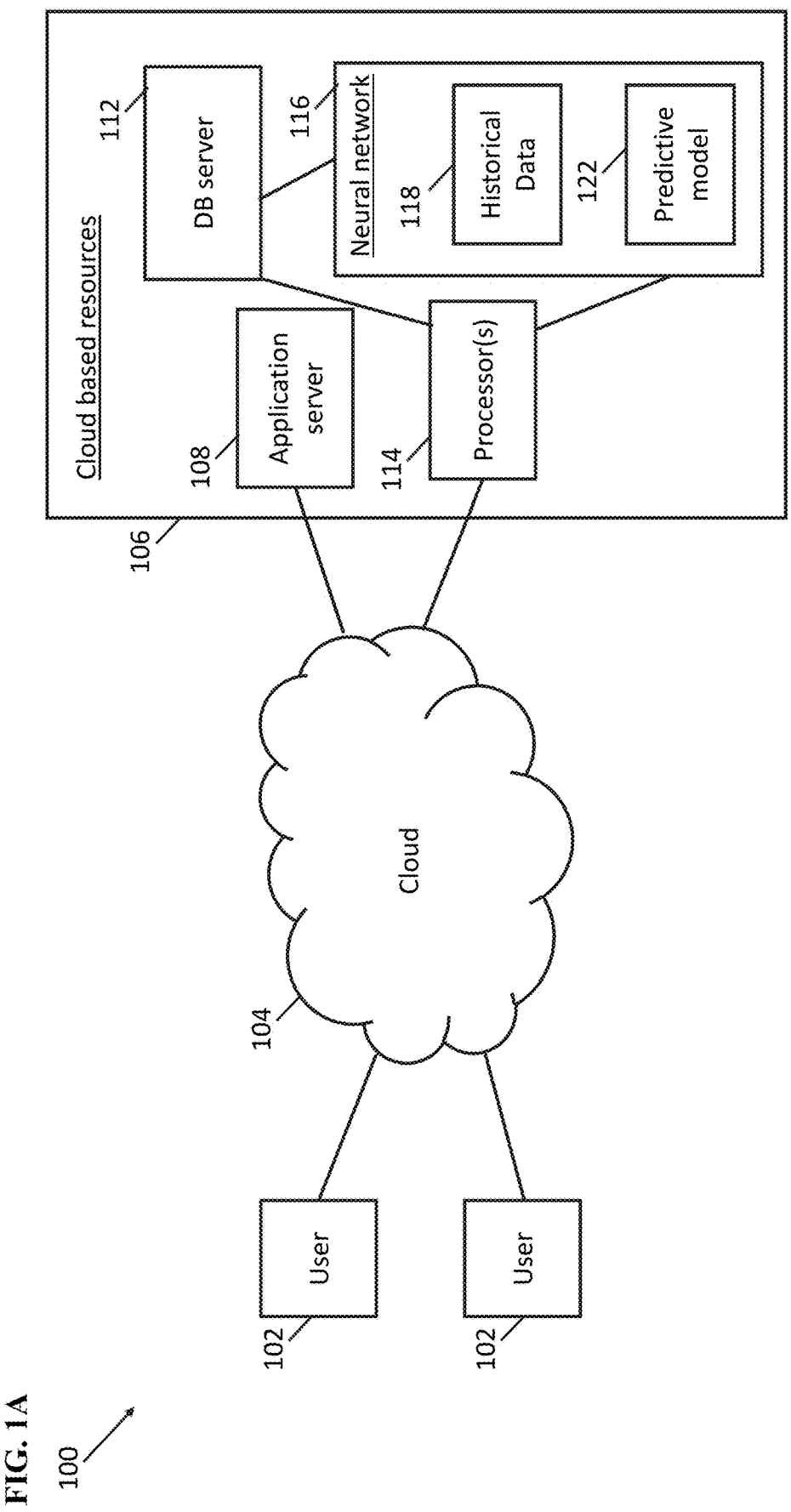
FIG. 1A illustrates a simplified block diagram of a network that includes a number of tenants in a public cloud network.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Cloud based resources (e.g., resources of a database (DB) server) may be accessed by a number of users (also referred to as "tenants" or "customers"). In the situation where one user is accessing a relatively high amount of the DB server resources, such access may negatively impact other users of the cloud based resources. In such cases, access to the resources may need to be adjusted or throttled.

Embodiments of the present disclosure describe a method and system for a two-stage mitigation of threats or risks of overuse of DBCPU resources by one or two consumers. The first mitigation strategy (also referred to as "early prevention strategy") is devised to predict and detect DBCPU overuse at an early time and regulate customer traffic with a-slow-enough speed so that DBCPU usage is reduced. All customer requests, at this stage, may continue to be delivered to database servers instead of being timed out, and service throughput may be enhanced, as a result. The first mitigation strategy may leverage artificial intelligence and machine learning techniques to predict and detect anomaly at an early time before DBCPU overuse (or anomaly) can create a large impact. Once an anomaly is detected, top contributors to the anomaly may be identified. Operationally, customers may be ranked based on their DBCPU usage over the past 10 minutes to 20 minutes and the top contributor may be identified for regulation of traffic therefrom.

The second mitigation strategy (also referred to as "final guard strategy") may be triggered when an existing DBCPU anomaly tends to persist in spite of the deployment of the first mitigation strategy. The emission speed of data from the top contributing user, in such an eventuality, may be dynamically adjusted based on an ingress speed of data requests received by the top contributing user.

In an aspect of the disclosed subject matter, a computer-implemented method for data management in a public cloud network is disclosed. The computer implemented method includes predicting, based on a previous usage of a cloud-based computing resource by a plurality of users of the cloud-based computing resource, a future usage of the cloud-based computing resource. The method also includes predicting, based on the predicted future usage of the cloud-based computing resource, an anomaly event at the cloud-based computing resource. The method further includes implementing a first anomaly mitigation action, based on the prediction of the anomaly event at the cloud-based computing resource. The method also includes re-evaluating a status of the anomaly event at the cloud-based computing resource after the implementation of the first anomaly mitigation action, and implementing a second anomaly mitigation action at the cloud-based computing resource, based on the re-evaluation of the status of the anomaly event.

Implementing the first anomaly mitigation action may include identifying a top contributing user from the plurality of users that is responsible for a highest usage of the cloud-based computing resource. The top-contributing user may be identified, for example, using a machine learning algorithm.

Part of the anomaly mitigation action may include throttling or otherwise limiting access of the top contributing user to the cloud-based computing resource.

Implementing the second anomaly mitigation action may include dynamically adjusting an emission speed of data requests from the top contributing user to the cloud-based computing resource. The emission speed of data from the top contributing user may be dynamically adjusted based on an ingress speed of data requests received by the top contributing user.

The anomaly event at the cloud-based computing resource may be predicted based on a regression analysis of a number of database usage metrics related to the cloud-based computing resource.

The cloud-based computing resource may include a database (DB) central processing unit (CPU) server.

In an aspect of the disclosed subject matter, a non-transitory machine-readable storage medium is disclosed that provides instructions that, if executed by a processor, are configurable to cause said processor to perform operations and methods for predicting, based on a previous usage of a cloud-based computing resource by a plurality of users of the cloud-based computing resource, a future usage of the cloud-based computing resource as disclosed herein.

In an aspect of the disclosed subject matter, a system is disclosed for storing and managing source data related to a number of tenants in a public cloud network. The system may include a computer processor configured to run a public cloud network digitally connected with the computer processor. The system may also include a non-transitory machine-readable storage medium that provides instructions that are configurable to cause the apparatus to perform any of the methods disclosed herein.

FIG. 1A illustrates a simplified block diagram of a network 100 that includes a cloud-based resource, in accordance with various implementations. The network 100 may include a number of users 102. As used herein, a user 102 may refer to an entity, individual, tenant, customer or group of individuals that is/are accessing a cloud-based computing resource. For example, a user 102 may be a single individual that is accessing the cloud-based computing resource through an internet-connected electronic device such as a laptop computer, a desktop computer, a cellular phone, a personal digital assistant (PDA), a tablet, or some other electronic device. Additionally, or alternatively, a user 102 may refer to a grouping of a plurality of individual users. For example, a user 102 may be a school, a business, multi-unit housing, a corporation, etc. with a plurality of individuals that are accessing the cloud-based resource. In this use case, such individuals may be grouped according to one or more of a variety of parameters such as which floor they are on, which business unit they are assigned to, an internet protocol (IP) address, the entity (e.g., the business or school or building) with which they are associated, etc. It will be noted that, although only two users 102 are depicted in FIG. 1A, in real-world implementations the network 100 may include only a single user or three-or-more users. The specific number of users may be based on, for example, network capacity, network bandwidth, user need, existing agreements between the entity with which the user is associated and an internet service provider (ISP), etc.

The user(s) 102 may be communicatively coupled with one or more cloud-based resources 106. As illustrated in FIG. 1A, the user(s) 102 may be coupled with the resources 106 via a cloud connection 104. As used herein, the cloud connection 104 may refer to one or more wired or wireless communication techniques by which the user(s) 102 may communicate with the cloud-based resources 106. Such communication techniques may include, for example, WiFi, long term evolution (LTE), third generation (3G), fourth generation (4G), fifth generation (5G), new radio (NR), cellular communication, wired communication (e.g., over a fiberoptic cable or some other wired connection), and/or one or more other routers, base stations, wired elements, or some other electronic device that may be configured to pass electronic (i.e., data) signals between two electronic devices.

The cloud-based resources 106 may include a number of resources as shown in FIG. 1A. It will be understood that the depiction in FIG. 1A of the types of resources, the number of resources, or their specific connections is presented herein as a highly simplified example for the sake of discussion. Real-world implementations may include significantly more (or, in some cases, fewer) resources, more complicated connections between the resources, etc. Additionally, it will be recognized that, in real-world implementations, various of the elements may be implemented as hardware, software, firmware, or some combination thereof. In some implementations, various of the elements (e.g., the processor(s) 114 and the neural network 116) may be part of the same logic, the same electronic device, etc., while in other implementations such cloud-based resources 106 may be physically separate from one another (in different electronic devices) and/or may be in different locations from one another.

The cloud-based resources 106 may include an application server 108 that is communicatively coupled with one or more DB servers 112. Generally, the application server 108 may be a server that is configured to provide one or more services to the user(s) 102. Such services may be operation of one or more applications. The DB server 112 may store, or facilitate the storage of, information that is accessible by the application server 108 so that the application server 108 may provide the services to the users 102. In one implementation, the DB server 112 may include a large amount of memory where the information may be stored. In another implementation, the DB server 112 may be implemented as logic that is communicatively coupled with large amounts of memory. As such, it will be recognized that access to the application server 108 by a user 102 to provide a service to the user 102 may include several transactions to be read from, or written to, the DB server or, more specifically, a central processing unit (CPU) or some other logic thereof.

In the cloud environment, customers' requests are first submitted to the application servers 108. The application servers 108 may extract data-retrieval related requests from the original requests and issue database requests to the database servers 112. The database servers 112 may process database requests, and then return the results to the application servers 108. The application servers 108 may receive the results from database servers, execute the rest of the business logic, and return final results to the users 102. As DBCPU resources directly determine how fast database servers 112 process customer requests, DBCPU resources may significantly impact the quality and availability of the cloud based services provided to the users 102.

Referring back to FIG. 1A, the cloud-based resources 106 may additionally include one or more processors 114, and a neural network 116. As may be seen, the neural network 116 and/or the processor(s) 114 may be communicatively coupled with the DB server 112.

Generally, as noted, a high degree of access of the application server 108 and, subsequently, the DB server 112 may put a significant strain on the DB server 112. In legacy implementations, such strain may have resulted in a user's 102 access to one or more of the cloud-based resources becoming throttled. As used herein, "throttled" may refer to a limit being placed on the user's 102 access to the resource. In some cases, the limit may be defined in terms of total bandwidth available in a given time period (e.g., per-second, per-minute, etc.), total number of transactions (e.g., read or write requests) in a given time period, and/or some other type of limit. In some implementations, such a limit may be pre-defined (e.g., a user 102 may always be throttled to a limit of x transactions per-minute). In other implementations, such a limit may be dynamic (e.g., a user 102 may be throttled to a limit of x % of the total transactions over a given time period, or x % of the user's 102 previous transactions over a given time period). It will be understood that this description of throttling provides some examples of how throttling may be implemented, and other implementations may implement throttling in a different manner, e.g., with respect to how throttling is performed, what the throttling level is, etc.

In some legacy implementations, such throttling may have been performed based on an ongoing analysis, where the decision to throttle was made based on the current state of the system and/or the current state of the user's 102 strain on the cloud-based resources 106. Once the decision was made, then the user's 102 access to the cloud-based resources 106 (e.g., the DB server) may have been restricted.

By contrast, implementations herein relate to a mechanism by which an impending throttling of the user's 102 access to the cloud-based resources 106 (under conventional techniques or other arrangements) may be predicted, and subsequently prevented. The implementation described herein will be discussed with reference to the DB server 112, but it will be recognized that similar operations may be provided for access to other cloud-based resources.

In this implementation, the neural network 116 (which may also be referred to as "artificial intelligence," or "machine learning") may be coupled with the DB server 112 (or some other cloud-based resource). The neural network 116 may collect and/or maintain historical data 118 related to the usage of the DB server 112. Such historical data 118 may include a number of fields or data points such as "time accessed," "workload," CPU usage of a DB server 112, the number of bytes written into or read from a given database, a number of sequential reads in a given database, an average number of active sessions at a given time, etc. It will be noted that these factors are intended as non-exhaustive examples of factors that may be used, and other implementations may use one or more additional or alternative factors.

Specifically, the fields or data points may relate to workload at a number of different time intervals such that a pattern of the workload may be identified. The historical data 118 may relate to usage by a number of different users 102. The historical data 118 may be stored in a memory (e.g., a non-volatile memory) that is part of the neural network 116 (i.e., part of an electronic device that implements the neural network 116) or in a data storage device that is communicatively coupled with the neural network 116. The historical data 118 may be saved in a table format, a database, or some other computer-readable format. The specific format and fields of the historical data 118 may be widely variable dependent on the specific implementation thereof.

Based on this historical data, the neural network 116 may be able to generate a predictive model 122 related to a user's 102 predicted future usage of the DB server 112. In other words, if the user 102 has a pattern of use, then the predictive model 122 may be configured to predict the future usage of the DB server 112 by the user based on the historical data 118. A specific example of such prediction is provided in FIG. 1C, as will be discussed in greater detail below.

The output of the prediction may be provided to a processor 114. As noted, in some implementations, the processor 114 may be part of the same electronic device, hardware, firmware, and/or software that implements the neural network 116. In other implementations, the processor 114 may be separate from the neural network 116. The processor 114 may be configured to provide, based on the predicted future usage of the DB server 112 and prior to occurrence of the throttling, an indication to a user 102 that their access to the DB server 112 will be throttled.

In some implementations, the decision to throttle the access of a user 102 to the DB server 112 may be based on the predicted future usage exceeding a threshold usage value. In some cases, such a threshold may be based on an absolute value (e.g., above x transactions, using x % of the total resources of the DB server 112, etc.). In other cases, such a threshold may be based on a dynamic value (e.g., the user 112 is responsible for above x % of the total resource usage, etc.). In some cases, the identification that the user 112 will exceed the threshold may be measured over a given time period. For example, if the threshold is based on a prediction that the user may use greater than x % of the total resources of the DB server 112, the throttling may only be triggered if such use is to occur for a specific time period (e.g., as may be measured in terms of seconds, minutes, tens of minutes, etc.).

In some implementations, the predictive model 122 may output a confidence factor related to the predicted usage. Such a confidence factor may be taken into account by the processor 114 when identifying whether to throttle the user 102. For example, if the confidence factor is below a given value, then the throttled may not be triggered by the processor 114. This use of a confidence factor may likewise allow for some degree of flexibility in the model such that a temporary spike will not result in an erroneous throttled of the user 102.

In some implementations, the processor 114 may be configured to perform the identification that the throttling is to occur. In this case, the processor 114 may make such an identification based on an indication provided by the neural network 116 regarding the predicted usage of the DB server 112 by the user 102. Based on this identification, the processor 114 may trigger a throttling of the access of the user 102 to the DB server 112. In some cases, the processor 114 may further be communicatively coupled with the DB server 112 such that the processor 114 may additionally control the occurrence of the throttling.

In another implementation, the neural network 116 may identify that the throttling is to occur. That is, the neural network 116 may include logic (not shown in FIG. 1) that is configured to receive and interpret the predicted usage provided by the predictive model 122. Based on the predicted usage of the DB server 112 by a user 102, the logic may be configured to identify that the user's 102 access to the DB server 112 need to be throttled. The neural network 116 may then trigger a throttling of the access of the user 102 to the DB server 112.

Figure 1B:
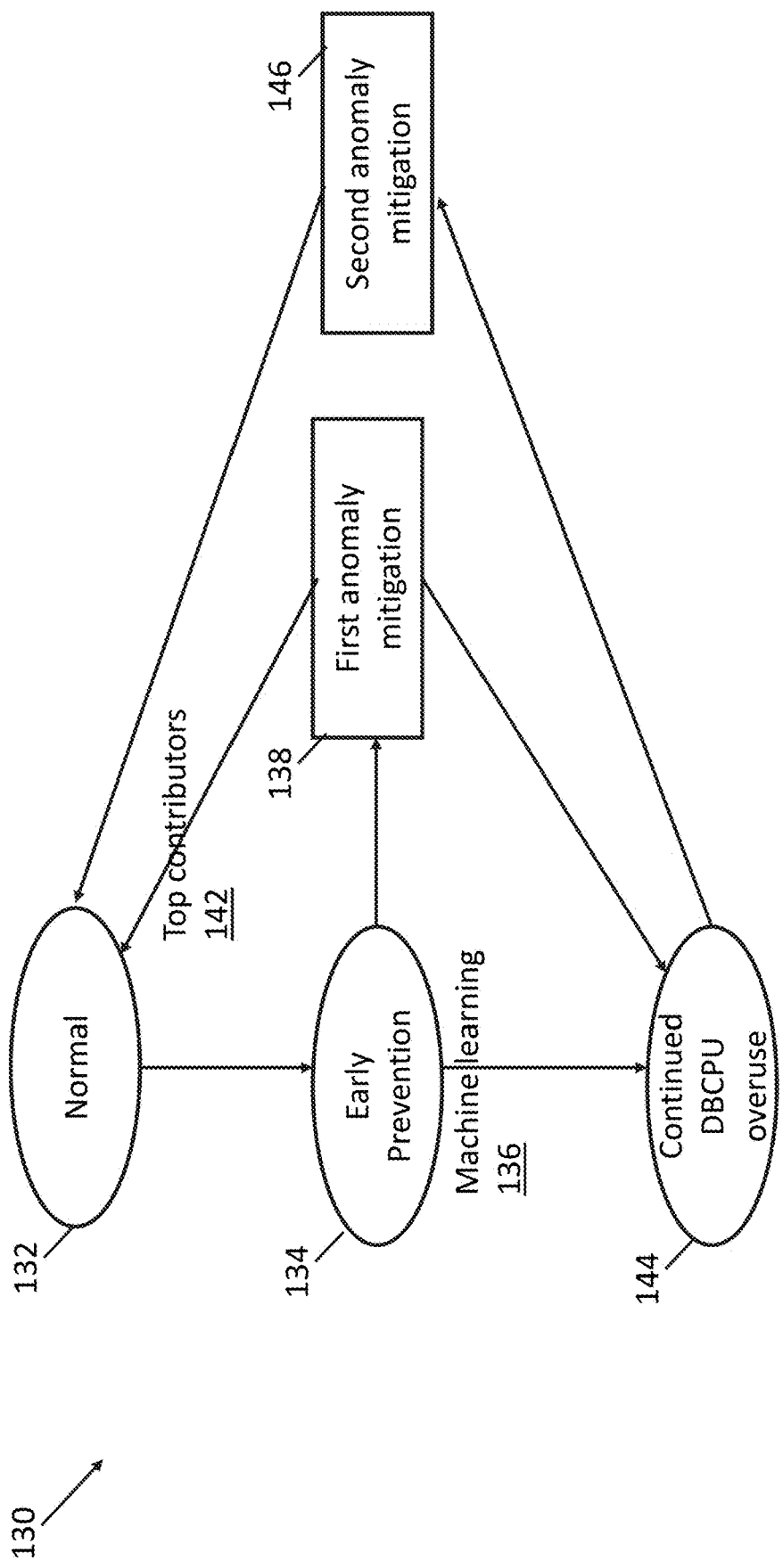
FIG. 1B illustrates an example two-stage anomaly mitigation strategy related to usage of a cloud-based resource in a public cloud network of FIG. 1A.

FIG. 1B illustrates an example two-stage anomaly mitigation strategy 130 related to usage of a cloud-based resource. DBCPU overuse (also referred to as "anomaly") is one of the major causes that downgrade service quality and availability. When one customer overuses DBCPU resources, the remaining customers may suffer inferior service experience. To protect customer service quality, it may be necessary to detect DBCPU overuse, identify the major contributor behind the overuse, and throttle the traffic from the major contributor as a preventive measure.

Conventional throttling techniques put requests from the major contributors into a throttle queue. A typical throttle queue emits requests at a low speed so that database servers become less stressed with lower DBCPU usage. The disadvantages of conventional throttling techniques are that the throttling may result in bad customer experience and inferior system throughput. The speed of emission from a throttle queue is usually set in a heuristic way and a low speed may effectively reduce DBCPU usage. A low speed, however, may eventually timeout customer requests resulting in service disruption, low DBCPU usage, and high cost-to-serve.

The example two-stage anomaly mitigation strategy 130 is devised to mitigate DBCPU anomalies by a traffic regulation method that may enable enhanced data throughput and improved customer experience. When a normal operating condition 132 is threatened to be disrupted by an anomaly event such as an overuse of resources by one customer, as in 134, the anomaly event may be predicted based on the predicted future usage of the cloud-based computing resource. In an embodiment, the anomaly event may be predicted based on a regression analysis of a number of database usage metrics related to the cloud-based computing resource. The example database usage metrics may include mean database checking-in time, mean database connection-in-wait time, mean database connection utilization, database host-free memory, database sessions memory, database total foreground sessions, high frequency database CPU, used percentage of memory storage, throttle headroom of memory storage and the like.

Referring back to FIG. 1B, the two-stage mitigation strategy 130 may include a first mitigation strategy 138 (also referred to as "early prevention strategy") and a second mitigation strategy 146 (also referred to as "final guard strategy"). The first mitigation strategy 138 is devised to detect DBCPU overuse 144 at an early time and regulate customer traffic with a-slow-enough speed so that DBCPU usage is reduced. All customer requests may still be delivered to database servers instead of timeout, and service throughput may be enhanced. The first anomaly mitigation strategy 138 may be implemented based on the prediction of the anomaly event at the cloud-based computing resource before DBCPU overuse 144 can create a large impact. Once an anomaly is detected, customers may be ranked based on their DBCPU usage over the past 10 minutes to 20 minutes. The first anomaly mitigation action 138 may include identifying a top contributing user 142 that is responsible for a highest usage of the cloud-based computing resource. In an instance, the top contributing user 142 may be identified based on an artificial intelligence or machine learning algorithm 136. The two-stage anomaly mitigation strategy 130 and specifically, the first mitigation strategy 138 may further include a traffic regulation by throttling of an access of the top contributing user 132 to the database servers 112 of FIG. 1A.

A status of the anomaly event at the cloud-based computing resource may be re-evaluated after the implementation of the first anomaly mitigation strategy 138 and a second anomaly mitigation strategy 146 may be implemented if the DBCPU anomaly persists even after an implementation of the first mitigation strategy 138. The second anomaly mitigation strategy 146 is elaborated in detail in relation to FIG. 1D below.

Figure 1C:
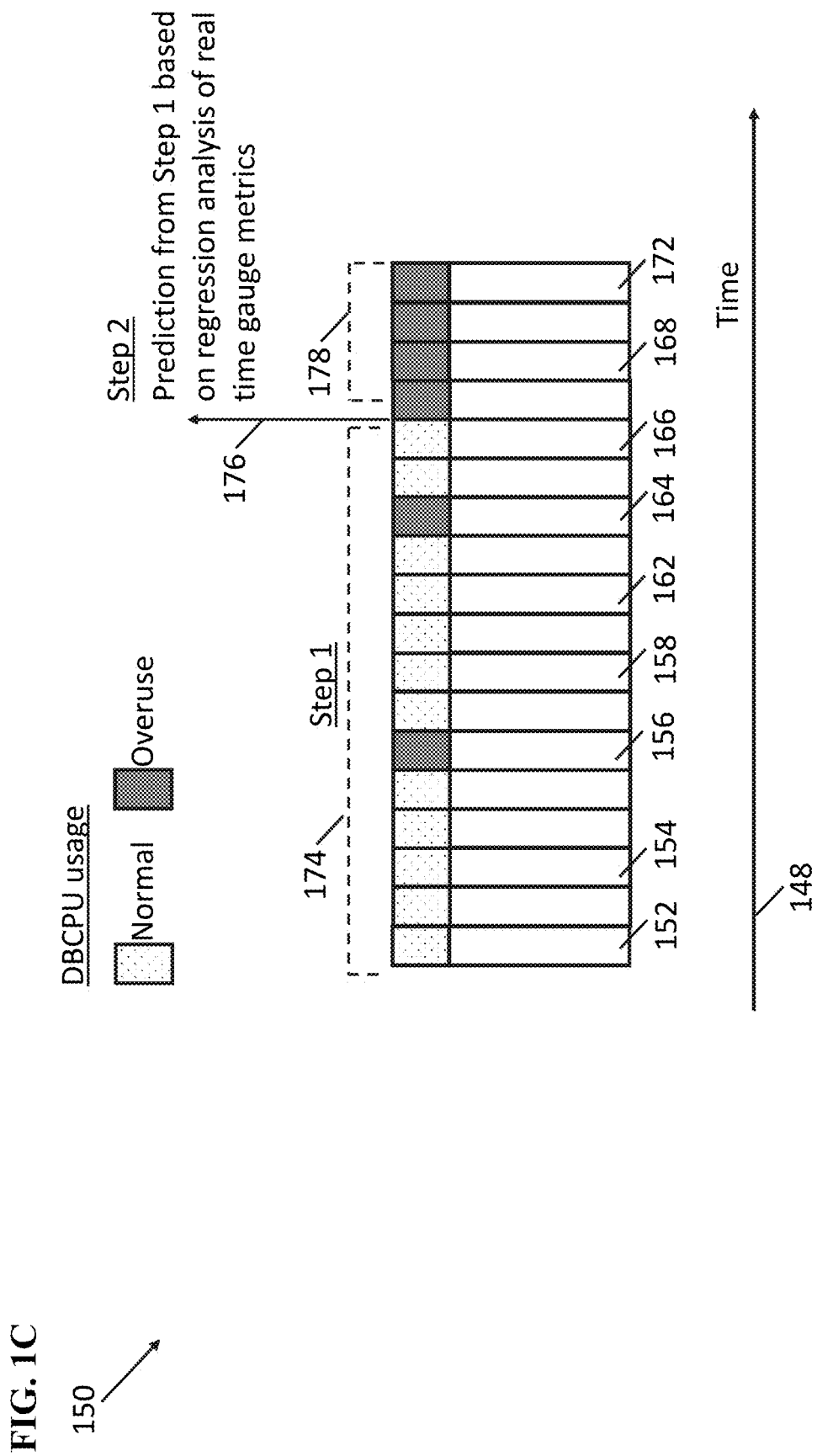
FIG. 1C illustrates an example first anomaly mitigation strategy related to usage of a cloud-based resource in a public cloud network of FIG. 1A.

FIG. 1C illustrates an example first anomaly mitigation strategy 150 related to usage of a cloud-based resource (e.g., the DB server 112), in accordance with various implementations. Specifically, the X-axis 148 of FIG. 1C may represent different time intervals (152, 154, 156, 158, 162, 164, 166, 172 and so on). In this particular example, the time increments may be in units of minutes. In this example, the usage of the cloud-based resource may be the usage of the resource by a single user.

The timeline 148 depicts two degrees of "usage" by the user. Specifically, the dot shaded blocks 152, 154, 158, 162, 166 may be example time intervals in which the user (e.g., user 102) has a "low" amount of usage of the DB server 112. The solid-shaded blocks 156, 164, 168, 172 may be example time intervals in which the user has a "high" amount of usage of the DB server 112. As described above, the terms "low" and "high" may be relative terms, and may be based on a dynamic or pre-defined limit as previously-described with respect to throttling. Specifically, "high" may be an amount of usage that is at or above the above-described limit and which may indicate that throttling may be desirable. Conversely, "low" may be an amount of usage that is at or below the above-described limit, and which may not mean that throttling is desirable.

The user's usage over an example time period that includes several time intervals may be indicated at 174. Specifically, the user's usage may span through time intervals 152, 154, 156, 158, 162, 164, and 166. At 166, the neural network 116 and, more particularly, the predictive model 122 may identify, based on the usage at 174, that it is likely that a user's access to the DB server 112 may be throttled. For example, the predictive model 122 may predict that the user's usage during duration 178 (i.e., through time intervals 168, 172) may attain a high amount of usage which may result in the user's access to the DB server being throttled at the end of the time period 178.

In some implementations, the user's usage that is analyzed or identified at 174 may be based on analysis of elements that are similar to those in the historical data 118 upon which the predictive model 122 is based. For example, the user's usage may be identified based on CPU usage of a DB server 112, the number of bytes written into or read from a given database, a number of sequential reads in a given database, an average number of active sessions at a given time, etc. As noted above, it will be understood that this list of factors is intended as a non-exhaustive list of example factors that may be used, and other factors may additionally or alternatively be used in other implementations.

Figure 1D:
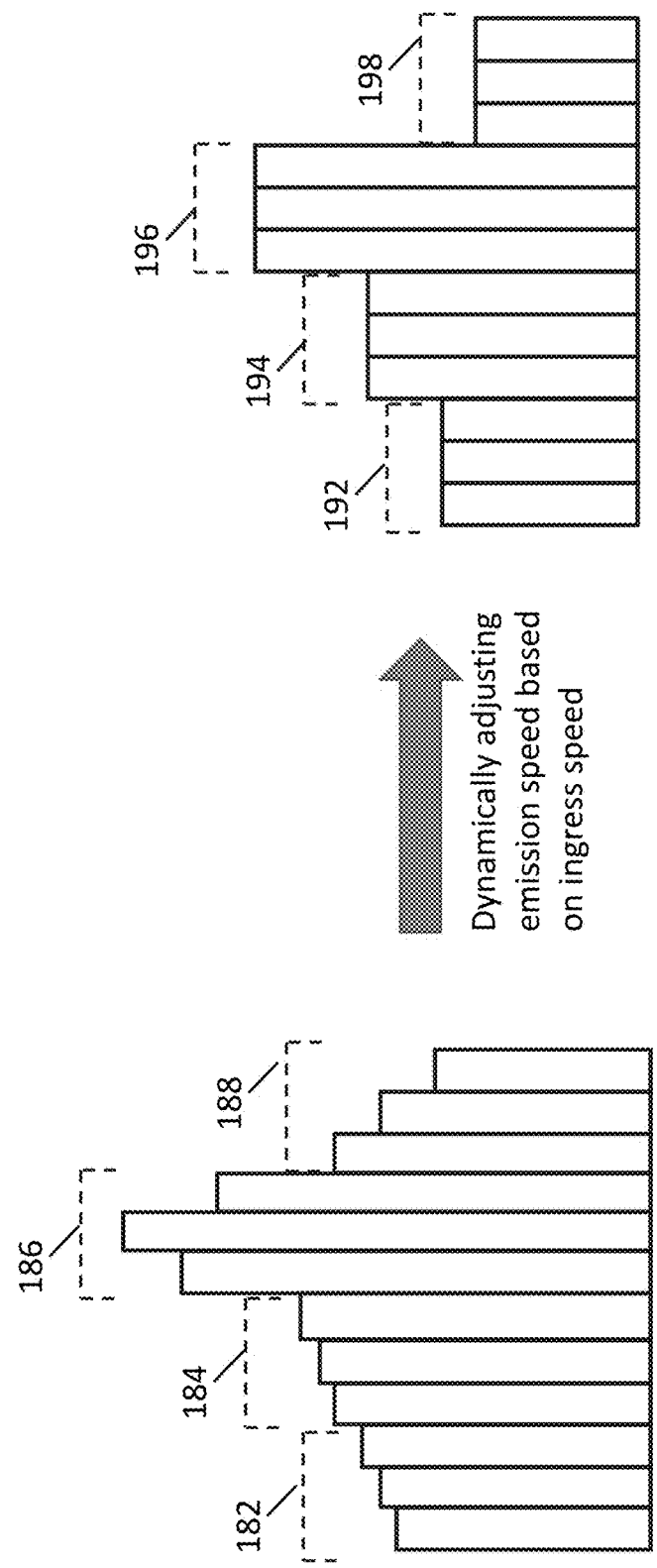
FIG. 1D illustrates an example second anomaly mitigation strategy related to usage of a cloud-based resource in a public cloud network of FIG. 1A.

FIG. 1D illustrates an example second anomaly mitigation strategy 180 (such as 146 of FIG. 1B) related to usage of a cloud-based resource such as database server 112 of FIG. 1A. A status of the anomaly event at the cloud-based computing resource may be re-evaluated after the implementation of the first anomaly mitigation strategy 150 of FIG. 1C (or 138 of FIG. 1B) and a second anomaly mitigation strategy 180 of FIG. 1D (or 146 of FIG. 1B) at the cloud-based computing resource may be implemented based on the re-evaluation of the status of the anomaly event. Specifically, the second mitigation strategy 180 may be triggered, if and when existing DBCPU protection techniques interpret that the DBCPU resources continue to experience the anomaly or the overuse situation persists even after an implementation of the first mitigation strategy 150 of FIG. 1C (or 138 of FIG. 1B). In other words, the second anomaly mitigation strategy 180 is triggered when it is no more workable to enhance data throughput and improve customer experience without sacrificing service availability. In this case, service availability may be prioritized and the second anomaly mitigation strategy 180 may be employed at the existing DBCPU services to improve availability of the services to the users 102.

In such an eventuality, the second anomaly mitigation strategy 180 may take over the traffic regulation, and use dynamic throttling techniques to improve service availability. In operation, "early prevention queues" may be placed at the applications servers 108 of FIG. 1A. To elaborate further, when application servers 108 of FIG. 1A find an incoming request match the criteria identifying from the top contributor, the request may be inserted into an early prevention queue, as illustrated in FIG. 1D.

The request arrival speed, at this stage, may be re-calculated based on the most recent data at every minute, and emission speed may be adjusted accordingly. As is commonly known in the art, emission speed essentially indicates a quota that allows the queue to emit a request. For a request that is at the end of a queue, it may be emitted from the queue when it meets one of the following conditions. First, there may still be space left for request emission that is approaching its deadline for timeout. In this case, instead of timing out this request, the queue may emit the request. Second, an emission speed of data requests from the top contributing user (142 of FIG. 1B) may be dynamically adjusted. Specifically, the emission speed of data from the top contributing user (142 of FIG. 1B) may be dynamically adjusted based on an ingress speed of data requests received by the top contributing user (142 of FIG. 1B). As a non-limiting example, the request emission speed (i.e., number of requests per second) may be calculated using an example formula:

$$\text{Emission speed} = \max([\text{request arrival speed}]*0.8, 0.5)$$

As a result, the uneven data spikes over time intervals 182, 184, 186, and 188 may be dynamically adjusted, respectively, to be more evened out over time intervals 192, 194, 196, and 198. In effect, the adjusted or controlled smoothening or flattening of the data requests may eliminate the data spikes and thereby, eliminate the anomalies at the database servers 112 of FIG. 1A, giving rise to enhanced data throughput and improved customer experience.

Figure 2:
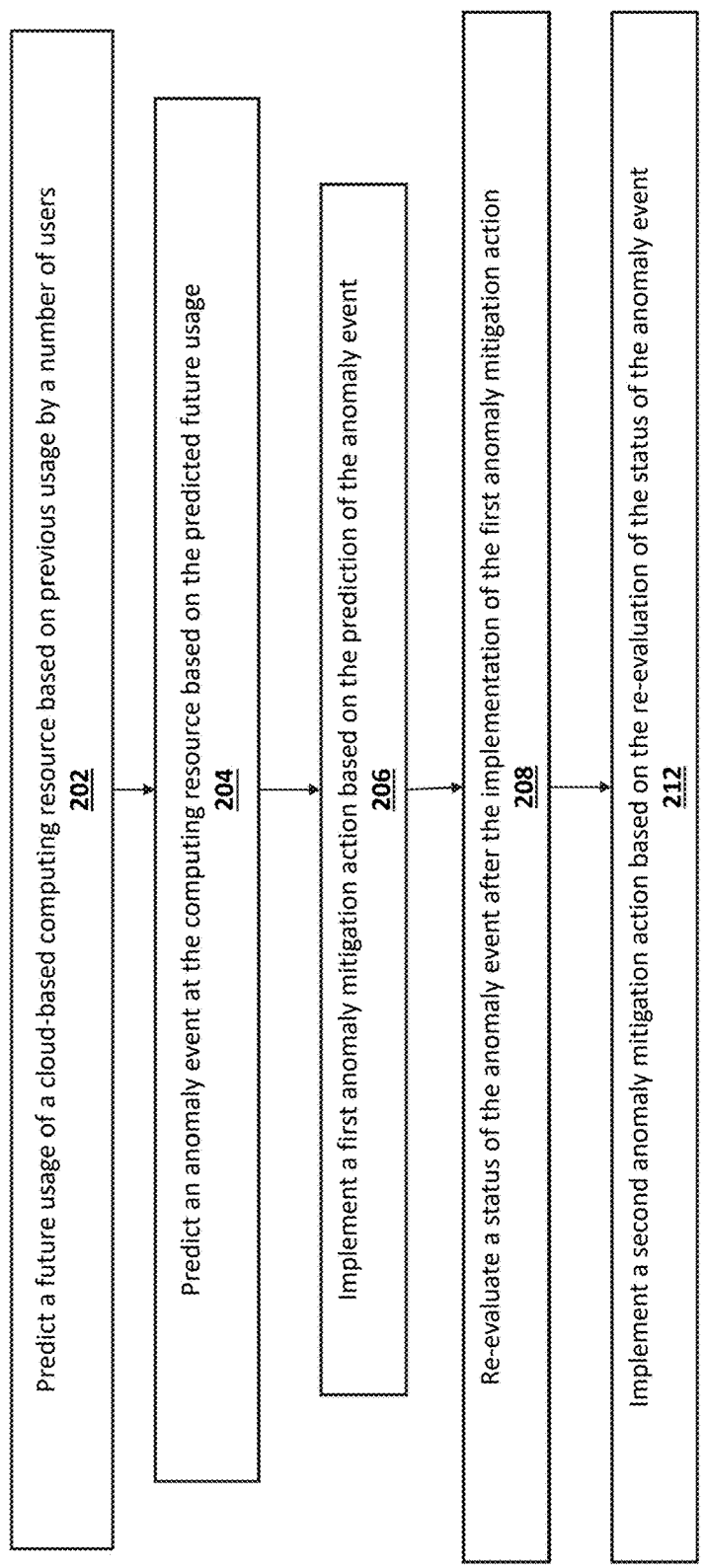
FIG. 2 is a flow diagram illustrating an example two-stage anomaly mitigation method related to usage of a cloud-based resource in a public cloud network of FIG. 1A.
Figure 3A:
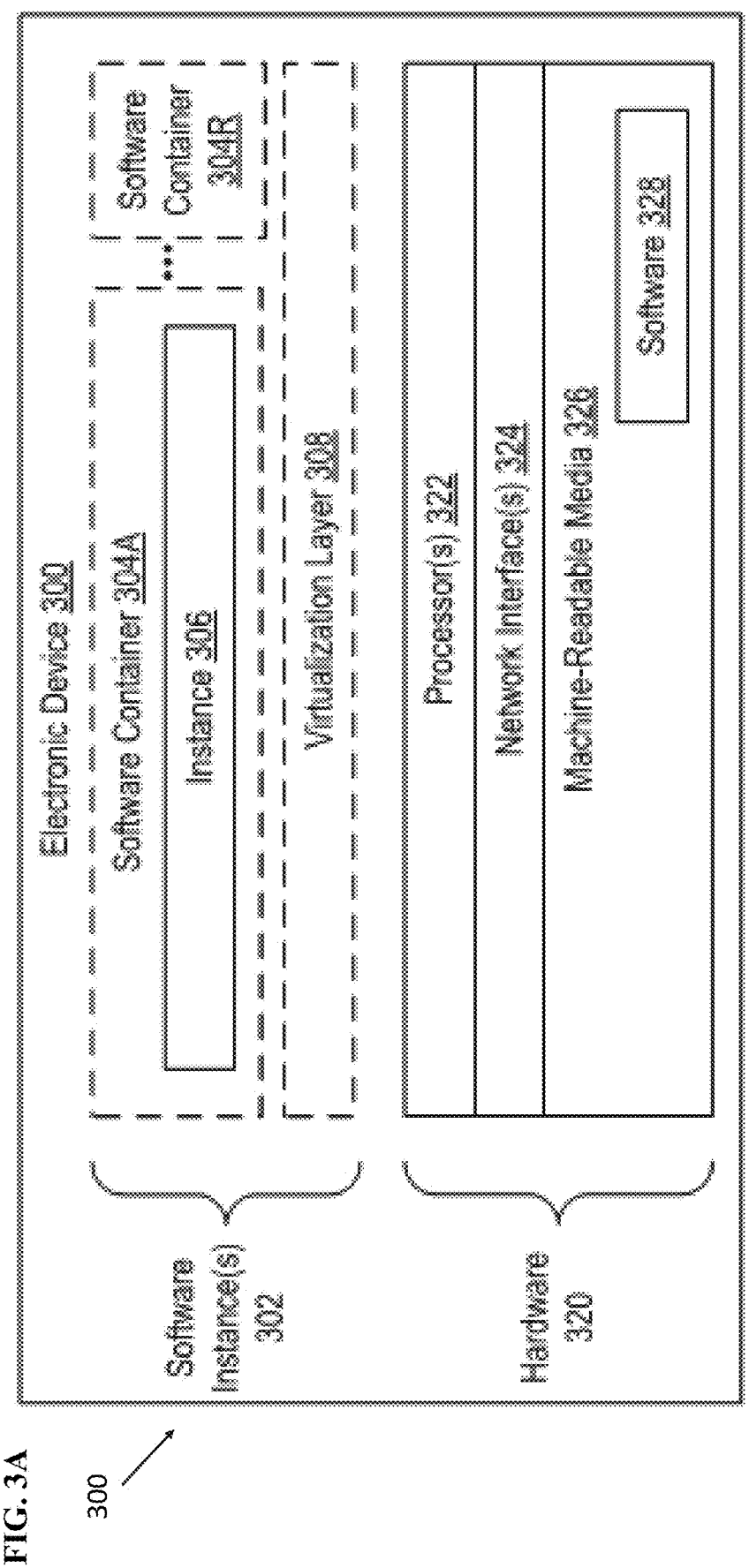
FIG. 3A is a block diagram illustrating an exemplary electronic device according to an example implementation.
Figure 3B:
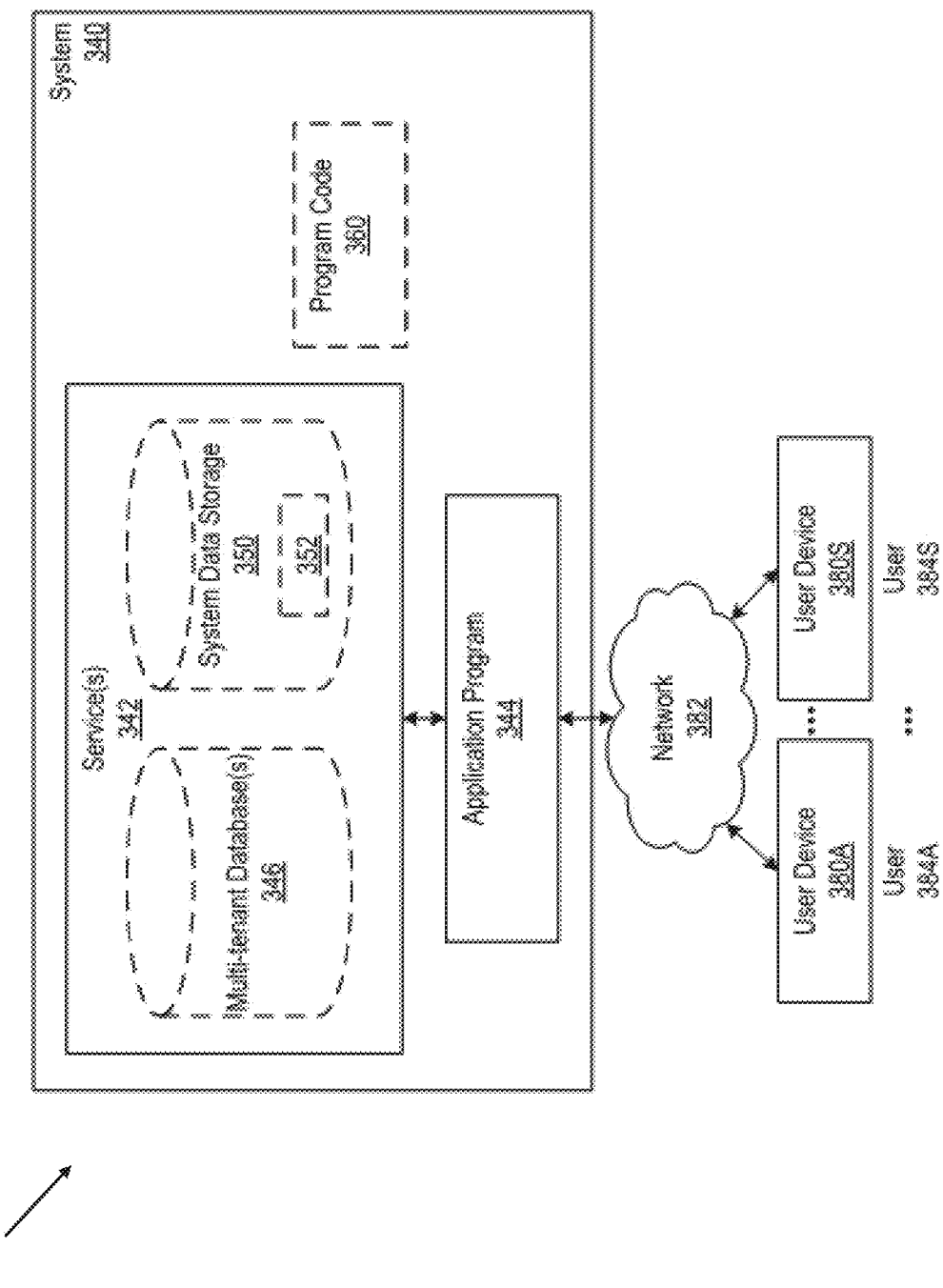
FIG. 3B is a block diagram of an exemplary deployment environment according to an example implementation.

FIG. 2 is a flow diagram illustrating an example two-stage anomaly mitigation method 200 related to usage of a cloud-based resource in a public cloud network of FIG. 1A, as disclosed herein. The method 200 may be performed, for example, by a system as shown in FIGS. 1A to 1C operating in conjunction with the hardware as shown in FIGS. 3A and 3B and/or by software executing on a server or distributed computing platform. Although the steps of method 200 are presented in a particular order, this is only for simplicity.

The computer-implemented method 200 may include, as in step 202, predicting, based on a previous usage of a cloud-based computing resource by a number of users of the cloud-based computing resource, a future usage of the cloud-based computing resource. The cloud-based computing resource may include a database (DB) central processing unit (CPU) server.

At 204, an anomaly event at the cloud-based computing resource may be predicted based on the predicted future usage of the cloud-based computing resource. The anomaly event at the cloud-based computing resource may be predicted based on a regression analysis of a number of database usage metrics related to the cloud-based computing resource.

At 206, a first anomaly mitigation action may be implemented based on the prediction of the anomaly event at the cloud-based computing resource. The first anomaly mitigation action may include identifying a top contributing user from the number of users that is responsible for a highest usage of the cloud-based computing resource. In an instance, the top contributing user may be identified based on a machine learning algorithm.

The method 200 may further include throttling of an access of the top contributing user to the cloud-based computing resource. The method 200 may also include dynamically adjusting an emission speed of data requests from the top contributing user to the cloud-based computing resource. The method may further include dynamically adjusting the emission speed of data from the top contributing user to the cloud-based computing resource, based on an ingress speed of data requests received by the top contributing user.

At 208, a status of the anomaly event at the cloud-based computing resource may be re-evaluated after the implementation of the first anomaly mitigation action. At 212, a second anomaly mitigation action at the cloud-based computing resource may be implemented based on the re-evaluation of the status of the anomaly event.

Embodiments of the present disclosure describe a method and system for two-stage mitigation of DBCPU anomalies. The first mitigation strategy is devised to predict and detect DBCPU overuse at an early time and regulate customer traffic with a-slow-enough speed so that DBCPU usage is reduced. The first mitigation strategy leverages artificial intelligence and machine learning techniques to predict and detect anomaly at an early time before it can create a large impact. Once an anomaly is detected, top contributors to the anomaly may be identified and traffic, therefrom, may be regulated for improved service conditions. In operation, however, the DBCPU anomaly may continue to persist in spite of the deployment of the first mitigation strategy. In such as eventuality, the second mitigation strategy may be triggered and the emission speed of data from the top contributing user may be dynamically adjusted based on an ingress speed of data requests received by the top contributing user.

One or more parts of the above implementations may include software. Software is a general term whose meaning can range from part of the code and/or metadata of a single computer program to the entirety of multiple programs. A computer program (also referred to as a program) includes code and optionally data. Code (sometimes referred to as computer program code or program code) includes software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (typically, though not necessarily an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices. The term "consumer" refers to another computer service that is running the reusable software components of the system of FIG. 1.

FIG. 3A is a block diagram illustrating an electronic device 300 according to some example implementations. FIG. 3A includes hardware 320 including a set of one or more processor(s) 322, a set of one or more network interfaces 324 (wireless and/or wired), and machine-readable media 326 having stored therein software 328 (which includes instructions executable by the set of one or more processor(s) 322). The machine-readable media 326 may include non-transitory and/or transitory machine-readable media. Each of the previously described clients and server components may be implemented in one or more electronic devices 300. In one implementation: 1) each of the clients is implemented in a separate one of the electronic devices 300 (e.g., in end user devices where the software 328 represents the software to implement clients to interface directly and/or indirectly with server components (e.g., software 328 represents a web browser, a native client, a portal, a command-line interface, and/or an application programming interface (API) based upon protocols such as Simple Object Access Protocol (SOAP), Representational State Transfer (REST), etc.)); 2) server components is implemented in a separate set of one or more of the electronic devices 300 (e.g., a set of one or more server devices where the software 328 represents the software to implement the framework for providing additional security to protected fields in protected views); and 3) in operation, the electronic devices implementing the clients and server components would be communicatively coupled (e.g., by a network) and would establish between them (or through one or more other layers and/or other services) connections for submitting requests to server components and returning responses to the clients. Other configurations of electronic devices may be used in other implementations (e.g., an implementation in which the client and server components are implemented on a single one of electronic device 300).

During operation, an instance of the software 328 (illustrated as instance 306 and referred to as a software instance; and in the more specific case of an application, as an application instance) is executed. In electronic devices that use compute virtualization, the set of one or more processor(s) 322 typically execute software to instantiate a virtualization layer 308 and one or more software container(s) 304A-304R (e.g., with operating system-level virtualization, the virtualization layer 308 may represent a container engine (such as Docker Engine by Docker, Inc. or rkt in Container Linux by Red Hat, Inc.) running on top of (or integrated into) an operating system, and it allows for the creation of multiple software containers 304A-304R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-304R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 328 is executed within the software container 304A on the virtualization layer 308. In electronic devices where compute virtualization is not used, the instance 306 on top of a host operating system is executed on the "bare metal" electronic device 300. The instantiation of the instance 306, as well as the virtualization layer 308 and software containers 304A-304R if implemented, are collectively referred to as software instance(s) 302.

Alternative implementations of an electronic device may have numerous variations from that described above. For example, customized hardware and/or accelerators might also be used in an electronic device.

FIG. 3B is a block diagram of a deployment environment according to some example implementations. A system 340 includes hardware (e.g., a set of one or more server devices) and software to provide service(s) 342, including server components. In some implementations the system 340 is in one or more datacenter(s). These datacenter(s) may be: 1) first party datacenter(s), which are datacenter(s) owned and/or operated by the same entity that provides and/or operates some or all of the software that provides the service(s) 342; and/or 2) third-party datacenter(s), which are datacenter(s) owned and/or operated by one or more different entities than the entity that provides the service(s) 342 (e.g., the different entities may host some or all of the software provided and/or operated by the entity that provides the service(s) 342). For example, third-party datacenters may be owned and/or operated by entities providing public cloud services.

The system 340 is coupled to user devices 380A-380S over a network 382. The service(s) 342 may be on-demand services that are made available to one or more of the users 384A-384S working for one or more entities other than the entity which owns and/or operates the on-demand services (those users sometimes referred to as outside users) so that those entities need not be concerned with building and/or maintaining a system, but instead may make use of the service(s) 342 when needed (e.g., when needed by the users 384A-384S). The service(s) 342 may communicate with each other and/or with one or more of the user devices 380A-380S via one or more APIs (e.g., a REST API). In some implementations, the user devices 380A-380S are operated by users 384A-384S, and each may be operated as a client device and/or a server device. In some implementations, one or more of the user devices 380A-380S are separate ones of the electronic device 300 or include one or more features of the electronic device 300.

In some implementations, the system 340 is any generic network interface management system that uses web interfaces and includes server application components, client application components and a browser extension. The system and method provide for authenticating the end user via a browser extension that needs to be available in the intended user's web browser. The input to the system and method is the information about the views and its specific fields or any other part that is rendered and need to be protected, as provided by the application owner. Typical generic examples are Java clients and applications, Python based frameworks, libraries for client applications implementing the logic described above.

In some implementations, the system 340 is any generic network interface management system that uses web interfaces and includes server application components, client application components and a browser extension. The system and method provide for authenticating the end user via a browser extension that needs to be available in the intended user's web browser. The input to the system and method is the information about the views and its specific fields or any other part that is rendered and need to be protected, as provided by the application owner. Typical generic examples are Java clients and applications, Python based frameworks, libraries for client applications implementing the logic described above.

In some implementations, the system 340 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 340 is a multi-tenant cloud computing architecture supporting multiple services, such as one or more of the following types of services: Customer relationship management (CRM); Configure, price, quote (CPQ); Business process modeling (BPM); Customer support; Marketing; Predictive Product Availability for Grocery Delivery; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("application store"); Data modeling; Security; and Identity and access management (IAM). For example, system 340 may include an application platform 344 that enables PAAS for creating, managing, and executing one or more applications developed by the provider of the application platform 344, users accessing the system 340 via one or more of user devices 380A-380S, or third-party application developers accessing the system 340 via one or more of user devices 380A-380S.

In some implementations, one or more of the service(s) 342 may use one or more multi-tenant databases 346, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user devices 380A-380S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the multi-tenant database(s) 346 and/or system data storage 350.

In some implementations, the service(s) 342 are implemented using virtual applications dynamically created at run time responsive to queries from the user devices 380A-380S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the framework for modeling heterogeneous feature sets, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 340 and the user devices 380A-380S.

Each user device 380A-380S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 340. For example, the user interface device can be used to access data and applications hosted by system 340, and to perform searches on stored data, and otherwise allow one or more of users 384A-384S to interact with various GUI pages that may be presented to the one or more of users 384A-384S. User devices 380A-380S might communicate with system 340 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 380A-380S might include an HTTP client, commonly referred to as a "browser," for sending and receiving HTTP messages to and from server(s) of system 340, thus allowing users 384A-384S of the user devices 380A-380S to access, process and view information, pages and applications available to it from system 340 over network 382.

In the above description, numerous specific details such as resource partitioning/sharing/duplication implementations, types and interrelationships of system components, and logic partitioning/integration choices are set forth in order to provide a more thorough understanding. Embodiments disclosed herein may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is illustrative and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A computer implemented method comprising:
    predicting, based on a previous usage of a cloud-based computing resource by a plurality of users of the cloud-based computing resource, a future usage of the cloud-based computing resource;
    predicting, based on the predicted future usage of the cloud-based computing resource, an anomaly event at the cloud-based computing resource;
    implementing a first anomaly mitigation action, based on the prediction of the anomaly event at the cloud-based computing resource by:
        identifying one or more top contributing users from the plurality of users of the cloud computing resource usage and throttling the one or more top contributing users contributing user's access based on the first anomaly mitigation action;
    re-evaluating a status of the anomaly event at the cloud-based computing resource after the implementation of the first anomaly mitigation action; and
    implementing a second anomaly mitigation action at the cloud-based computing resource, based on the re-evaluation of the status of the anomaly event by:
        placing the received incoming data request of the plurality of data requests from the one or more top contributing users in a queue; and
        evaluating the received incoming data request of plurality of incoming data requests for the cloud-based computing resource and determining an emitting speed quota and the received incoming data request speed based on the evaluating; and
        dynamically adjusting an emitting speed of a queue data request based on the determined emitting speed quota and the received incoming data request speed.

2. The method of claim 1, wherein the top contributing user is determined from the plurality of users that is responsible for a highest usage of the cloud-based computing resource.

3. The method of claim 2, wherein the determining of the top contributing user from the plurality of users comprises identifying the top contributing user based on a machine learning algorithm.

4. The method of claim 3, further comprising throttling of an access of the top contributing user to the cloud-based computing resource.

5. The method of claim 1, wherein the predicting the anomaly event at the cloud-based computing resource comprises predicting the anomaly event based on a regression analysis of a plurality of database usage metrics related to the cloud-based computing resource.

6. The method of claim 1, wherein the cloud-based computing resource comprises a database (DB) central processing unit (CPU) server.

7. A non-transitory machine-readable storage medium that provides instructions that, if executed by a processor, are configurable to cause said processor to perform operations comprising:
    predicting, based on a previous usage of a cloud-based computing resource by a plurality of users of the cloud-based computing resource, a future usage of the cloud-based computing resource;
    predicting, based on the predicted future usage of the cloud-based computing resource, an anomaly event at the cloud-based computing resource;
    implementing a first anomaly mitigation action, based on the prediction of the anomaly event at the cloud-based computing resource by:
        identifying one or more top contributing users from the plurality of users of the cloud computing resource usage and throttling the one or more top contributing users contributing user's access based on the first anomaly mitigation action;
    re-evaluating a status of the anomaly event at the cloud-based computing resource after the implementation of the first anomaly mitigation action; and
    implementing a second anomaly mitigation action at the cloud-based computing resource, based on the re-evaluation of the status of the anomaly event by:
        placing the received incoming data request of the plurality of data requests from the one or more top contributing users in a queue;
        evaluating the received incoming data request of plurality of incoming data requests for the cloud-based computing resource and determining an emitting speed quota and the received incoming data request speed based on the evaluating; and
        dynamically adjusting an emitting speed of a queue data request based on the determined emitting speed quota and the received incoming data request speed.

8. The non-transitory machine-readable storage medium of claim 7, wherein the top contributing user is determined from the plurality of users that is responsible for a highest usage of the cloud-based computing resource.

9. The non-transitory machine-readable storage medium of claim 8, wherein the determining of the top contributing user from the plurality of users comprises identifying the top contributing user based on a machine learning algorithm.

10. The non-transitory machine-readable storage medium of claim 9, further comprising throttling of an access of the top contributing user to the cloud-based computing resource.

11. The non-transitory machine-readable storage medium of claim 7, wherein the predicting the anomaly event at the cloud-based computing resource comprises predicting the anomaly event based on a regression analysis of a plurality of database usage metrics related to the cloud-based computing resource.

12. The non-transitory machine-readable storage medium of claim 7, wherein the cloud-based computing resource comprises a database (DB) central processing unit (CPU) server.

13. A system comprising:
a processor;
a cloud-based computing resource digitally connected with the processor;
a non-transitory machine-readable storage medium that provides instructions that, if executed by the processor, are configurable to cause the system to perform operations comprising:
predicting, based on a previous usage of the cloud-based computing resource by a plurality of users of the cloud-based computing resource, a future usage of the cloud-based computing resource;
predicting, based on the predicted future usage of the cloud-based computing resource, an anomaly event at the cloud-based computing resource;
implementing a first anomaly mitigation action, based on the prediction of the anomaly event at the cloud-based computing resource by:
identifying one or more top contributing users from the plurality of users of the cloud computing resource usage and throttling the one or more top contributing users contributing user's access based on the first anomaly mitigation action;
re-evaluating a status of the anomaly event at the cloud-based computing resource after the implementation of the first anomaly mitigation action; and
implementing a second anomaly mitigation action at the cloud-based computing resource, based on the re-evaluation of the status of the anomaly event by:
placing the received incoming data request of the plurality of data requests from the one or more top contributing users in a queue; and
evaluating the received incoming data request of plurality of incoming data requests for the cloud-based computing resource and determining an emitting speed quota and the received incoming data request speed based on the evaluating; and
dynamically adjusting an emitting speed of a queue data request based on the determined emitting speed quota and the received incoming data request speed.

14. The system of claim 13, wherein the top contributing user is determined from the plurality of users that is responsible for a highest usage of the cloud-based computing resource.

15. The system of claim 14, wherein the determining of the top contributing user from the plurality of users comprises identifying the top contributing user based on a machine learning algorithm.

16. The system of claim 15, further comprising throttling of an access of the top contributing user to the cloud-based computing resource.

17. The system of claim 13, wherein the cloud-based computing resource comprises a database (DB) central processing unit (CPU) server.

18. The system of claim 13, wherein the cloud-based computing resource comprises a database (DB) central processing unit (CPU) server.

* * * * *